Oct. 11, 1960
B. F. JONES
2,955,677
WHEEL AND BRAKE
Filed July 8, 1958
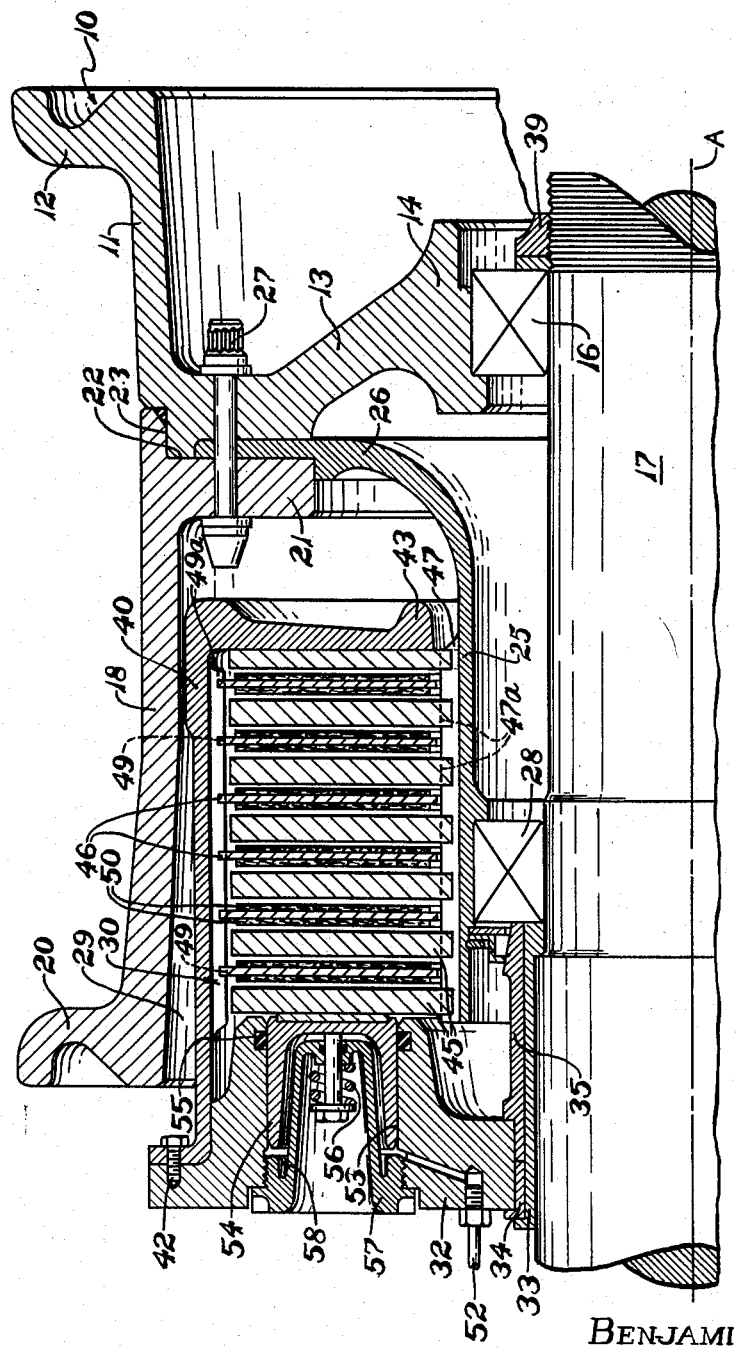
INVENTOR.
BENJAMIN F. JONES
BY
John D. Haney
ATTY.

United States Patent Office 2,955,677
Patented Oct. 11, 1960

2,955,677

WHEEL AND BRAKE

Benjamin F. Jones, Troy, Ohio, assignor to The B. F. Goodrich Company, New York, N.Y., a corporation of New York Filed July 8, 1958, Ser. No. 747,244

1 Claim. (Cl. 188—18)

This invention relates to an improved wheel and brake assembly particularly suited for aircraft or similar high energy braking service. The invention provides a wheel and brake mechanism which by virtue of its design has an unusually high energy capacity for the weight and the space it occupies.

The wheel and brake assembly of this invention includes a disc-type brake mechanism which forms an integral part of the wheel structure. A feature of the invention is that although the disc braking members are housed completely within the envelope of the wheel rim on which the tire is mounted, these brake members are so arranged that the rim and a tire mounted thereon are effectively insulated from extreme temperature peaks resulting from the heat generated during braking at the braking disc. According to this invention the heat developed in the disc braking members is transferred primarily to the hub structure of the wheel and to the brake frame itself, rather than to the wheel rim near the tire beads. This advantageously protects the tire beads from overheating and at the same time reduces thermal stresses in the tire supporting rim sections.

A wheel and brake assembly made in accordance with this invention and representing the preferred form in which the invention is to be practiced is shown in the accompanying drawing which shows a radial section through the assembly symmetrical about the axis center line A, the rotational axis of the wheel.

The assembly comprises a wheel 10 having an annular rim section 11 with an annular bead-seat flange 12 and an integral inwardly extending web 13 terminating at a hub 14 which turns on a bearing 16 on a non-rotatable axle 17.

The wheel further includes a second annular rim section 18 with an opposing bead-seat flange 20 and with an inner flange 21 having a face portion 22 which mates axially with a complementary face 23 on rim portion 11 to form a tire-supporting rim. The rim section 18 is axially longer than its associate section 11. A long tubular hub 25 extends axially of the wheel concentrically inside rim portion 18 and terminates in an outwardly flaring bell-like flange 26 which fits between the flange 21 and the web 13 of the rim portion. These latter three parts are fastened together by a set of tie bolts 27 which are accessible on the front of the web 13 (the right in the drawing) under rim portion 11 which would normally be the outside of the wheel assembly.

The end of tube 25 opposite its mounting flange 26 houses a bearing 28 on axle 17 which bearing together with bearing 16 provides rotatable support for the wheel.

The region between the outside surface of hub 25 and the interior of the rim section 19 together with the flange 21 and flange 26 define a deep annular well 29 inside the wheel within the envelope of its rim to receive brake mechanism collectively designated by numeral 30. This brake mechanism is a disc-type brake and includes an annular non-rotatable torque frame 32 which is rigidly fastened to the wheel axle 17 adjacent the end of the hub by annular concentric sleeves 33, 34 and 35 which fit over the axle from its unsupported end (which in the drawing would be the right end of the portion axle shown). Sleeves 33 and 36 project axially from the brake frame 32 and are engaged with the stationary race (not shown in detail) of the bearing 28. Axial locking force is obtained against these members to hold the torque frame 32 firmly by a lock nut 39 which bears against the stationary race of the other wheel bearing 16 near the open unsupported right end of the axle. It is, of course, important to anchor the torque frame rigidly to the axle 17 in this construction so that the brake torque is transmitted through the torque frame to the axle and for this purpose the frame may be keyed or secured against rotation on the axis in any suitable manner.

The torque frame 32 extends radially outward from the axle to the open mouth of the brake well and includes a cylindrical anvil member 40 secured by bolts 42 to the brake frame so that the anvil extends concentrically into the brake well. The anvil terminates in a radial extending foot member 43 near the bottom of the brake well close to the flange 21. The cylindrical anvil portion 40 is located near the rim section 18 but there is a substantial air gap or space separating these members. There is no metal-to-metal heat conducting path between the anvil 40 and the rim section 18 on which one of the tire beads is seated.

Housed inside the cylindrical portion 40 of the anvil is a series of annular brake discs 45 which are disposed radially of the wheel axis alternately between parallel lining carriers 46. The brake discs 45 are plane annular metal rings. At their inner periphery they are notched as at 47a to engage splines 47 extending longitudinally along the outside surface of the tubular hub 25. Hence the brake discs rotate with the wheel and hub 25 on bearings 16 and 28 and are adapted for axial slidable movement along the hub 25.

The lining carriers 46 are in the form of thin plane metal rings which are notched at 49 at their outer periphery to mesh with a series of splines 49a formed on the internal cylindrical surface of anvil portion 40. The opposing faces of the lining carriers 46 have attached to them friction lining material 50 which in a brake of this type is preferably a sintered metal lining material. The lining carriers are thus also slidable axially relative to the wheel structure by they are non-rotatable.

The brake is hydraulically actuated by means of a fluid supply line 52 in the brake frame 32 leading into each of a series of individual actuation cylinders 53 located axially through the brake frame 32 at arcuately spaced positions opposite the discs and lining carriers at the mouth of the brake well. In each cylinder there is a piston 54 sealed by an O-ring 55 which is displaceable against the opposition of a retractor spring 56 by the hydraulic fluid pressure to urge the brake discs axially against their respective intervening carriers and to clamp the group of discs and their carriers collectively against the rigid foot portion 43 of the anvil 40 to effect braking engagement. Each cylinder 53 is closed by an end cap 57 to define the pressure actuating chamber 58.

When the brake is actuated, the brake discs serve as the primary heat sinks to absorb the heat generated by the frictional engagement of the discs with the friction lining. In this design a major proportion of the heat generated is absorbed into the braking discs where it is in turn transferred by conduction to the inner tubular hub 25. The heat thus transferred to hub 25 is conducted through the hub and its mounting flange 26 to the flange 21 and web 13 of the wheel sections. The only direct path of heat conduction to the wheel sections, therefore, is through the flanges at their mating faces, a substantial distance from the tire-bead engaging flanges 20 and 12 of the respective wheel sections. For this reason, then, the tire bead flanges never reach the extreme temperatures to which the discs are subjected and the tire beads are accordingly protected.

The minor proportion of heat not absorbed by the brake discs is, of course, conducted by the lining carriers into the anvil 40 and in turn conducted to the brake frame. Inasmuch as the anvil 40 is separated by appreciable air gap from the surrounding rim portion 19, no heat is conducted to the rim section 19 by the anvil. The rim portion 19 receives from the anvil only such heat energy as would be radiated from the anvil 40. The resulting temperature rise in the rim portion 19 and in the bead flanges 20 from this radiant energy and from the energy conducted through flange 26 is of a very low order compared with that of the brake discs.

In summary, the construction advantageously provides for protecting the tire bead flanges and rim portions on which they are supported from excessive heating. It uniquely accomplishes this, however, in a way which makes it possible to use a brake of large energy absorption capacity inasmuch as the brake well 29 may be formed very deeply and a great number of brake discs may be packed within the envelope of the rim section 19 without making the assembly large and bulky.

The brake frame 32 and the anvil 40 thereon are preferably of steel, as are also the brake discs, the lining carriers and the hub 25. The rim sections 11 and 18, however, may be advantageously formed of much lighter structural metal such as magnesium or comparable structural metals.

Variations in the construction may be made within the scope of the appended claim.

I claim:

Wheel and brake mechanism comprising a pair of annular marginally flanged tire-supporting rim sections having faces mating axially for receiving a tire, the axial extent of one of said rim sections being appreciably longer than the axial extent of the other rim section measured from said mating faces, a web member integral with the axially shorter rim section and projecting radially inwardly from the mating face of said shorter rim section in axial offset relation to the portion of said shorter rim section engageable with a tire bead for rotatable engagement with an axle, a tubular hub member disposed concentrically within said longer rim section and terminating in a bell-shaped flange secured to both said longer and said shorter rim sections adjacent said mating faces thereof, said hub forming the web member of said longer rim section and having a bearing engagement of its end opposite the bell flange thereof with the axle and being adapted for rotatable engagement with such axle for supporting said rim sections cooperatively with said other web portion, said hub and said longer rim section defining an annular brake well therebetween, a non-rotatable brake frame for mounting on such axle at the mouth of said brake well, said brake frame including an annular anvil member extending into said well closely adjacent to but spaced from the inside surface of the longer rim section and terminating in a foot member disposed generally radially of the wheel axis near bottom of said brake well and terminating in radially spaced relation to said hub portion, a plurality of annular brake discs in splined engagement at their inner periphery with said hub for rotation therewith and for axial slidable displacement relative to the hub, and a series of annular brake lining carriers positioned alternately between said brake discs, said carriers being in splined engagement at their outer periphery with said anvil member so that the carriers and the discs cooperatively occupy substantially the entire radial extent of said brake well, and a hydraulically actuated piston carried in said brake frame at the mouth of said well for displacement in response to hydraulic pressure for pressing said brake members axially one against the other and against said foot member to effect braking action.

References Cited in the file of this patent

UNITED STATES PATENTS

| | | |
|---|---|---|
| 1,316,057 | Parker | Sept. 16, 1919 |
| 1,875,095 | Milan | Aug. 30, 1932 |
| 1,933,176 | Jonsson | Oct. 31, 1933 |
| 2,260,189 | Morrison | Oct. 21, 1941 |
| 2,379,972 | Lambert | July 10, 1945 |

FOREIGN PATENTS

| | | |
|---|---|---|
| 1,135,583 | France | Dec. 17, 1956 |
| 782,841 | Great Britain | Sept. 11, 1957 |